United States Patent
Patil et al.

(10) Patent No.: US 8,181,170 B2
(45) Date of Patent: *May 15, 2012

(54) UNWIND INFORMATION FOR OPTIMIZED PROGRAMS

(75) Inventors: Harish G. Patil, Shrewsbury, MA (US); Robert Muth, Brookline, MA (US); Geoff Lowney, Concord, MA (US)

(73) Assignee: Intel Corporation, Santa Clara, CA (US)

( * ) Notice: Subject to any disclaimer, the term of this patent is extended or adjusted under 35 U.S.C. 154(b) by 687 days.

This patent is subject to a terminal disclaimer.

(21) Appl. No.: 12/355,613

(22) Filed: Jan. 16, 2009

(65) Prior Publication Data

US 2009/0133008 A1 May 21, 2009

Related U.S. Application Data

(63) Continuation of application No. 10/888,663, filed on Jul. 8, 2004, now Pat. No. 7,480,902.

(51) Int. Cl.
*G06F 9/45* (2006.01)
(52) U.S. Cl. .......................... 717/154; 717/151; 717/158
(58) Field of Classification Search .................. None
See application file for complete search history.

(56) References Cited

U.S. PATENT DOCUMENTS

| 6,014,515 | A | 1/2000 | Burch | |
| 6,247,172 | B1 | 6/2001 | Dunn et al. | |
| 6,412,109 | B1 | 6/2002 | Ghosh | |
| 7,426,719 | B2 * | 9/2008 | Chaiken et al. | 717/151 |
| 7,480,902 | B2 * | 1/2009 | Patil et al. | 717/158 |
| 2002/0188931 | A1 * | 12/2002 | Ewart et al. | 717/154 |
| 2003/0101380 | A1 | 5/2003 | Chaiken et al. | |
| 2003/0115582 | A1 * | 6/2003 | Hundt et al. | 717/158 |
| 2003/0182655 | A1 * | 9/2003 | Hundt et al. | 717/158 |
| 2004/0128658 | A1 * | 7/2004 | Lueh et al. | 717/151 |
| 2005/0097535 | A1 | 5/2005 | Plum et al. | |
| 2008/0127120 | A1 | 5/2008 | Kosche et al. | |
| 2009/0133008 | A1 * | 5/2009 | Patil et al. | 717/158 |

FOREIGN PATENT DOCUMENTS

| WO | WO-0045255 | 8/2000 |
| WO | WO-2006014587 | 2/2006 |

OTHER PUBLICATIONS

John Mellor-Crummey, "Gaining Insight into Parallel Program Performance Using Sampling", Mar. 10, 2011, Rice University, pp. 1-50 <http://www.clear.rice.edu/comp422/lecture-notes/comp422-2011-Lecture15-PerformanceAnalysis.pdf>.*

(Continued)

*Primary Examiner* — Thuy Dao
*Assistant Examiner* — Ben Wang
(74) *Attorney, Agent, or Firm* — Blakely, Sokoloff, Taylor & Zafman LLP

(57) ABSTRACT

Analyzing a first binary version of a program and unwind information associated with the first binary version of the program, performing optimization on the first binary version of the program to produce a second binary version of the program based at least in part on the results of the analysis, and generating new unwind information for the second binary version of the program based at least in part on the results of the analysis and at least in part on the optimization performed.

12 Claims, 2 Drawing Sheets

OTHER PUBLICATIONS

Lattner et al., "LLVM: A Compilation Framework for Lifelong Program Analysis & Transformation", 2004 IEEE, pp. 1-12 <http://dl.acm.org/citation.cfm?id=977673>.*

Wang et al., "Flow Analysis on Intermediate Source Code for WCET Estimation of Compiler-Optimized Programs", 2009 15th IEEE International Conference on Embedded and Real-Time Computing Systems and Applications, pp. 22-27 <http://ieeexplore.ieee.org/xpls/abs_all.jsp?arnumber=5280039&tag=1>.*

"International Preliminary Report on Patentability", International Application No. PCT/US2005/024252, mailed Jan. 18, 2007, 9 pages.

"International Search Report and Written Opinion", International Application No. PCT/US2005/024252, mailed Dec. 1, 2005, 11 pages.

EPO, "Office Action", Application No. 05769289.9-1243, (Aug. 27, 2007), 5 pages.

Hennessy, John , "Program optimization and exception handling", *Conference Record of th Annual ACM SIG-PLAN-SIGACT symposium on Principles of programming*, No. ED8, (Jan. 1981), 200-206.

Intel, "Itanium Software Conventions and Runtime Architecture Guide", Document No. 245358-003, (May 2001), 1-100.

IPO of China, "Office Action", Application No. 200580022925.5, (Feb. 15, 2008), 10 pages.

Lattner, Chris , et al., "LLVM: A Compilation Framework for Lifelong Program Analysis & Transformation", *Proceedings of the Internl Symposium on Code Generation and Optimization, IEEE*, (Mar. 20, 2004), 1-12.

"Office Action for Japanese Patent Application No. 2007-520530", (Apr. 5, 2011), Whole Document.

"First Office Action for Japanese Patent Application No. 2007-520530", (Apr. 27, 2010), Whole Document.

* cited by examiner

UNWIND INFORMATION FOR OPTIMIZED PROGRAMS

CROSS REFERENCE TO RELATED APPLICATIONS

This application is a continuation of U.S. application Ser. No. 10/888,663, filed Jul. 8, 2004, entitled Unwind Information for Optimized Programs.

BACKGROUND

A program originally written in a human-readable or high level source language is generally transformed into an executable program in a machine language by a process of compilation and linking. The resulting version of the program, termed binary code, may be executed by a processor-based system. Programs are commonly divided up for convenience, reusability, design complexity management, and other reasons, into sub-programs termed procedures. Procedures may be referred to by other names e.g., functions in languages such as C or C++. A program that is divided into procedures in a high level language version will generally be compiled and linked into a binary version of the program also with procedures that approximately correspond to the ones in the high level language version of the program. After compilation and linking, a program that is executing on a system typically uses a program stack to assist in the calling of procedures and in returning to the main flow of the program or calling procedure, as is well known in the art. In general, because procedure calls may be nested and the main program may be thought of as a main procedure, in the following, the terms "calling procedure" and "called procedure" are used without loss of generality. A procedure call must store a set of values related to the context of the call on the program stack, including the values of registers being used by the calling procedure such as the instruction pointer and other registers that may be over written by the execution of the called procedure. Other data values such as local variables of the calling procedure and parameters that are not to be modified by the called procedure may also be stored on the stack. All data related to a specific invocation of a specific procedure on the stack is termed its stack frame or its activation record.

In a typical run-time system for executing programs on a system, a procedure, on being called, allocates its stack frame on the program stack as one of its first sets of actions, and populates the stack frame with data which may be modified as the procedure executes. Prior to exit, it releases the allocated stack frame and updates the program stack pointer before executing a return. Thus, the program stack is managed in the normal process of program execution by the mechanisms of procedure call and return processing. However, sometimes program control may be transferred out of a procedure to another procedure without the normal processing of the procedure return mechanism.

This may occur in one instance when a procedure executes a long jump type instruction that causes program control to transfer to another procedure at a different level of the program stack without the execution of the intervening returns. In another instance, this may occur if an exception occurs within a procedure causing transfer of control to an exception handler at another level of the program stack, again without the stack being managed by a sequence of return calls. In yet another instance, this may happen if a debugger is being used to debug a program and control is transferred by a debugger external to the program from a point within a procedure to a point up the chain of calls that led to the current statement. In languages and runtime systems that support multithreading, the same type of phenomenon may be caused by thread termination.

When such a transfer of control from within a procedure occurs, for program execution to resume correctly at the new point to which control is transferred, the program stack needs to be unrolled or unwound, in a sense to simulate the normal return process as if it had occurred at the point at which control is transferred out of the procedure. In order for a proper unwinding of the program stack, some runtime systems provide specific support that is included in the executable image of a program. This is in the form of unwind information or unwind tables that allow a runtime system to correctly restore context after an exit from a procedure at a point other than a normal return.

Unwind information may be associated with each statement of a procedure from which such an exit can occur. In some instances, the unwind information may be associated with a block of statements or region of a procedure for which the unwind information is the same for all statements. In others, the unwind information may be different for different individual statements, or for different blocks of statements.

The usefulness of unwind information may be seriously compromised or eliminated by post-link program optimization. Post-link program optimization is a set of techniques intended to improve program performance e.g., in terms of execution time, by a variety of techniques that alter the code of the binary post-link version of the program without altering its other behavior, such as its input-output behavior. Among the well known techniques used by program optimization are procedure splitting, loop unrolling, and moving instructions out of loops. These techniques result in a new binary version of the program which differs from the original program in several ways, including by the altering or deletion of existing procedures, the addition of new procedures, the replication of statements, and the deletion of statements from the original version program. Unwind information associated with the procedures and statements of the original program will in general be of limited to no use in unwinding of the program stack of the optimized program.

DETAILED DESCRIPTION

Figure 1:
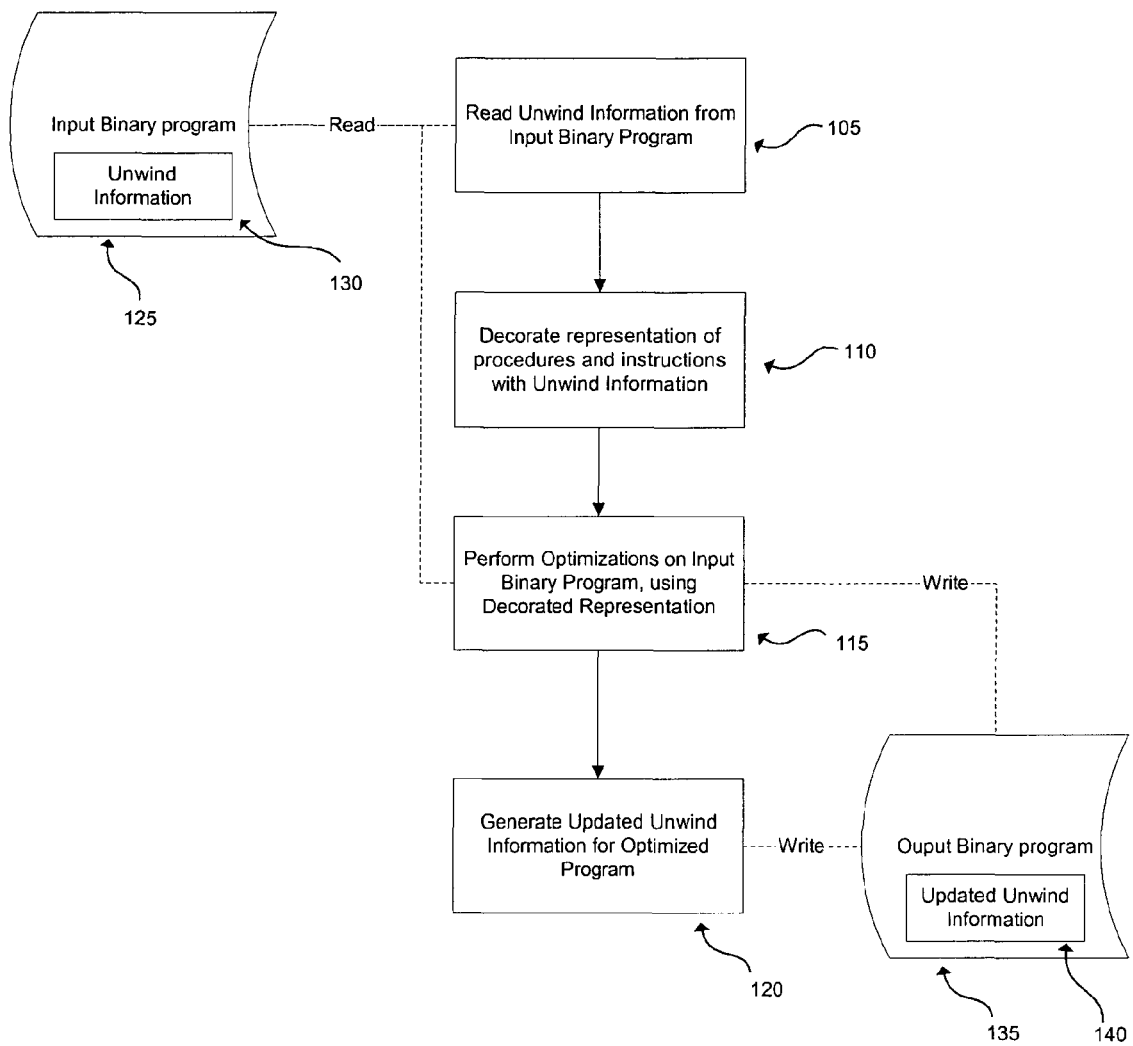
FIG. 1 is a high level flowchart of processing in one embodiment.

In one embodiment, processing occurs as depicted in FIG. 1. In brief overview, the following main phases form the processing: first, a post-link optimized binary version of a program, 125, with associated unwind information 130, is input to an analysis phase, 105 and 110. Analyzing the program consists of two main components, reading the unwind information from the input program, 105, and using the information to construct a detailed representation of the program and to associate additional annotations with (decorate) the representation of the statements and blocks of the program, 110. After this phase, optimization of the actual program occurs, 115, in which the decorated representation is used and updated as necessary to ensure that new unwind information consistent with the optimized version of the program may be regenerated after optimization. The optimized program, the decorated representation, and the unwind information of the original program are used in 120 to generate the new unwind information 140 which is consistent with and is stored with the optimized binary version of the program 135.

Next, each of these phases of processing in the embodiment is considered in additional detail. Unwind information is associated with a binary program by a compilation system including a compiler and a linker and may contain information such as that depicted in FIG. 2. One embodiment generally represented by the figure is the set of conventions for storing unwind information for the Intel® Itanium® processor family. This set of conventions is detailed in the Intel® Itanium® Software Conventions and Runtime Architecture Guide. In this embodiment, as in others, unwind information needs to detail at least how relevant register sets in use by the procedure should be restored if the program stack needs to be unwound at a specific point in the execution of the procedure. The unwind information for the Itanium® Processor family, for one example, consists of two sections. The first is a table with a set of records such as that shown at 202-206 in the figure, each of which corresponds to a particular position of the instruction pointer 208 in a procedure 212. In some embodiments, a range of values of the instruction pointer may correspond to the same set of records. The relationship between the instruction pointer and the location of the unwind information may in one embodiment be based on a mapping function applied to the instruction pointer to yield an index into an array of records of unwind information.

For the purposes of unwinding, each procedure may be divided into unwind regions throughout each of which the same set of unwind information is valid. Every unwind record in the table indicates the start and end points, 202 and 204, of the region within the procedure for which it is valid. In this embodiment these end points are recorded as pointers or addresses. The unwind region in the embodiment contains an information pointer which points to the actual data for the unwinding of the procedure for the specified region comprising an unwind descriptor area 210, a personality routine 214, and a language-specific data area (LSDA) 215. Of these, the latter two are generally compiler and language dependent and thus will vary from compiler to compiler even on the same platform.

The unwind descriptor segment 210 in turn primarily serves in this embodiment to specify how processor registers are to be treated in case of unwinding. Each register generally needs to be saved at a specific point in the execution of the procedure. The descriptors may describe what register is to be saved; at what instruction in the procedure it should be saved, and the location in memory to which it should be saved. For purposes of unwinding, the procedure may be divided into at least two regions: the prologue region and one or more body regions. A prologue region is one where the registers to be used by the procedure are established, existing register state may be saved, and the procedure's stack frame is allocated. A body region follows the prologue region and generally does not allocate stack frames or perform register saves and restores. Unwind information for the prologue section is generally more detailed than that for the body region because the set of the registers that are saved or unsaved may change from statement to statement.

Figure 2:
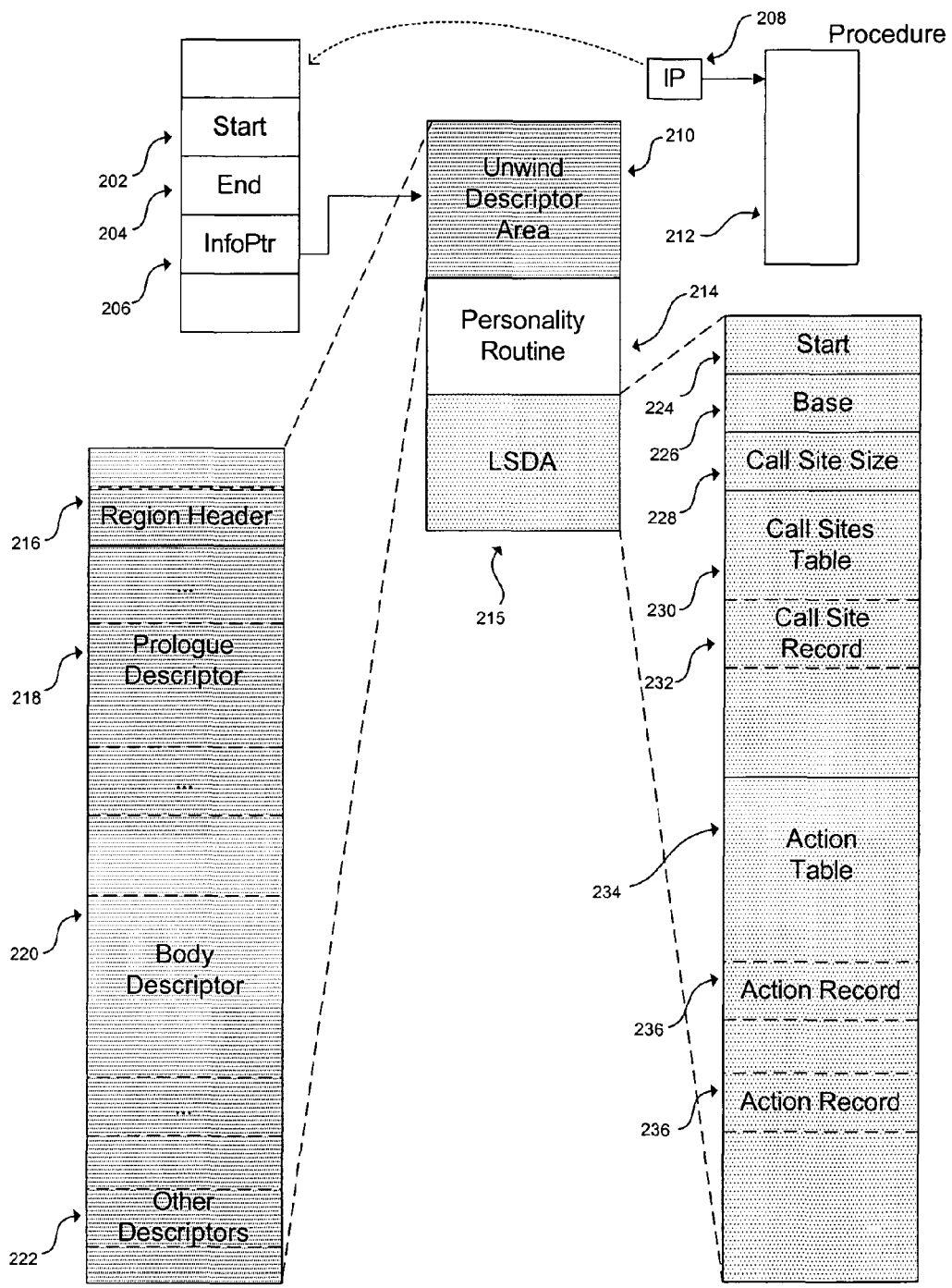
FIG. 2 is the data layout of unwind information in an embodiment.

As shown in FIG. 2, the unwind descriptor contains a region header 216 indicating the regions for which descriptors are provided in the unwind descriptor area. This may be followed by a prologue descriptor 218 and one or more body descriptors 220. Other descriptors 222 may also be used.

The next portion of the data for unwinding the procedure in this embodiment includes support for exception handling. Exceptions are well known error-handling mechanisms available in certain programming languages. In this embodiment the C++ language is used as an example, but exceptions and other analogous mechanisms are implemented in other programming languages including JAVA, Ada and others as is known in the art.

It is expected that one in the art would be sufficiently familiar with the general context of the C++ language. With specific reference to exceptions, the C++ programming language defines the semantics of the language keywords try, catch, and throw which may be used by programmers to construct code intended for exception handling. A try block is a block of statements usually followed by one or more catch blocks. Each catch block has either a type associated with it or the construct " . . . " which indicates a "catch all" condition. The statements and procedures called, if any, included in the try block may contain a throw statement. The throw statement in C++ requires an argument of some specific type.

The semantics of try, catch, and throw are generally as follows. At run time, if a throw statement is encountered during execution, a search phase begins for a matching catch. This search is first done in the present context, that is, the currently executing procedure, and then further up the call chain of procedures. If there is a catch clause that has the same type as the argument of the executed throw or that is a 'catch all' then a match occurs. The search phase ends either when a matching catch is or the main( ) procedure is reached. If there is no match, a run-time error is generated. If a matching catch is found then a cleanup phase begins. In the cleanup phase any local variables visible at the site of the throw are first destroyed. After destroying all visible local variables the current procedure is unwound, requiring the unwinding of the program stack. The same process (destroying local variables and unwinding the procedure) is repeated for each procedure in the call chain until the procedure with the matching catch is reached. Then control passes to the matching catch clause. The statements in the matching catch are executed and the control then passes to the statement following all the catch clauses.

Thus, when an exception occurs, it necessitates stack unwinding and therefore the use of the types of unwind information discussed previously. In addition, other types of unwind information to support exception handling may also be stored by a compiler and linker to enable proper handling of exceptions as part of unwinding. As in FIG. 2, this information consists, in this embodiment, of a personality routine 214 and an LSDA (language specific data area) 215. More detailed descriptions of these compiler-specific areas of the unwind information for the Intel® Itanium® processor runtime system may be found in the documentation relating to specific compilers released for the processor. In one instance the publicly available GNU gcc compiler version 3.1 for the Intel® Itanium® processor implements a compiler specific portion of the unwind area for C++ exception handling. In the following discussion an overview of the compiler-specific area sufficient to describe this embodiment is provided, the features described being likely to be included in a compiler designed to support C++ exception handling for Itanium.

In this embodiment, the personality routine 214 is a special procedure in the C++ run-time library for handling exceptions. The personality routine is dependent on the programming language of the compiler because the specific actions taken by the runtime system depend on the semantics of the exception handling construct in the language. The LSDA 215 consists of tables that point to code for matching various catch clauses, catch clause body code, and cleanup actions for the procedure. These code fragments implementing catch clause matching, the catch clause body, and cleanup actions are called landing pads. The layout of these tables is determined by the C++ compiler. The personality routine is also specific not just to the C++ language but also to the specific C++ compiler used to generate the binary version of the program because the compiler needs to understand the layout of the tables in the LSDA.

FIG. 2 shows the format of the LSDA for the depicted embodiment. Start, 224, Base, 226, and Call Site Size, 228 are header fields. Start is the start address relative to which addresses of landing pads may be specified. Base is the offset to the end of the types table (described below). Call Site Size is the table size in bytes.

The header field is followed by a call site table. Generally, a compiler would translate a throw statement into a procedure call to the C++ runtime system. Each such call is handled by a call site in the call sites table 230. Each call site is associated with an optional pointer to a landing pad and a pointer to an action table at 232. Action table 234 includes type information for catch clauses stored in action records 236; this information is used for finding a match for a throw at runtime.

In the above, referring again to the flowchart in FIG. 1, post-link information 130 relating to unwinding, including exception handling, has been described for one embodiment. The structures described for this embodiment are not unique ways of representing either language independent or language and compiler-specific information for unwinding. Other structures may be used, such as lists, tables, hashed data arrays, among many others known in the art. The fields and arrangement of data may vary in other embodiments. In some embodiments, certain data may be omitted, e.g. the base address for the call site table may be assumed to be the same as the procedure start address.

Next the analysis and optimization phases of the processing depicted at 105-115 in FIG. 1 are considered in more detail. These phases process unwind information from the input program, transform it as the program is optimized, and regenerate the information for the output optimized program.

Reading Unwind Information: In one embodiment, unwind information as depicted in FIG. 2 is read and interpreted, 105 in FIG. 1, by a pre-optimization phase of a post-link optimizer. The optimizer reads all the unwind and unwind information sections in the input binary version of the program including the unwind and unwind information sections. It generates an internal representation for the program's instructions and procedures. The optimizer determined the compiler used to generate the incoming program from the personality routine. The optimizer then walks through the unwind table. For each unwind table entry representing a procedure as in FIG. 2 at 202-206, the embodiment follows pointers into the unwind information section at 210, 214 and 215 and starts interpreting the unwind information records like those depicted at 216-222. If a LSDA exists for a particular procedure, the optimizer interprets the LSDA using the format specific to the compiler used to generate the LSDA. As described above, the records are grouped by the unwind regions in the procedure. For each region, an unwind state data structure that includes the length of the region in instruction slots and a sequence of smaller unwind data structures for procedure registers are generated. An unwind data structure for a register specifies where the register should be restored from (e.g. from the activation record or from another register) and when the specification becomes valid (e.g. at which instruction slot number relative to the unwind region).

Decorating a program representation: Next, internal representations for various program components—e.g. for an instruction, for a basic block (sequential group of instructions with straight-line control flow), and for a procedure are generated, 110 in FIG. 1. After interpreting unwind information in the manner described above, this embodiment generates a sequence of unwind state records for various unwind regions in a given procedure. It then attaches these unwind state records to the representation corresponding to the procedure. The optimizer then uses the decoded call-site table from the LSDA to generate a decoded type table and a decoded action table for each procedure. It attaches these tables to the representation of the procedure. Next the optimizer in this embodiment walks through the representation of each procedure visiting basic blocks and instructions while consulting the unwind state records. If the when field for a register in the unwind state record points to a slot corresponding to a given instruction the optimizer attaches special unwind attributes encoding the fact to that instruction. The optimizer consults the decoded call site table to check if a landing pad exists at the basic block or instruction being visited, and if one does, the optimizer adds a relationship in its internal representation between the call site and the currently visited basic block or instruction. After this process, some instructions in procedures of the representation are now decorated with unwind attributes, at 110. The optimizer also ensures that unwind regions begin and end at basic block boundaries and marks each basic block as either "prologue" or "body".

After this phase the optimizer in this embodiment can generate an unwind rule for any instruction in the program based on its representation of the program. The rule encodes an unwind state record that includes the effect of all the unwind state records from the beginning of the procedure through the instruction. The unwind rule for an instruction indicates how to unwind out of the enclosing procedure at that instruction.

Performing Optimizations The optimizer next may perform various optimizations on procedures and instructions, 115, with the following unwind-related considerations:

i. An instruction with unwind attributes is never deleted; if it needs to be duplicated the unwind attributes get duplicated as well.

ii. A basic block with a call site which is related to a landing pad basic block is never deleted.

iii. If a basic block with a call site is duplicated, the relation between it and the landing pad is also duplicated in the optimizer's representation.

iv. No instruction movement is allowed across basic blocks of different region types (e.g. prologue and body)

v. When a procedure is split or divided into noncontiguous code segments the new fragment (called the child) inherits the unwind state record, as well as the decoded type table and the decoded action table corresponding to the unwind rule for the instruction at the point of split in the original procedure (called the parent).

Regenerating Unwind Information: During optimization, instructions in unwind regions may be moved so the when fields for various registers in the unwind state may not be accurate. Further the unwind regions may have been shrunk or expanded so their length as recorded in the unwind state needs to change. Call sites and landing pads may be moved around so that the original call site tables are no longer accurate, although because the optimizer does not delete type information, the type table continues to be valid. The optimizer processes unwind state records for all unwind regions for all procedures making adjustments to when fields and unwind region length field. The call-site table for the optimized version of the program is created by traversing all the basic blocks with call sites in the procedure and looking for any related landing pads. The new call site table for the optimized procedure may then be generated. A child fragment of a split procedure is processed in a special manner—its copy of the unwind state record that it inherited from its parent gets marked as having zero length. Having a zero-length prologue implies that the when fields for various registers in the unwind information point to the beginning of the procedure. Copies of the decoded type and action tables are created for the child based on the type and action tables of the parent.

Generating a call-site table for the child fragment of a split procedure may create an issue if the landing pad field in the call site table in the LSDA is described as an offset from the base value (226 in FIG. 2, encoded in the LSDA header) because, generally, this offset is assumed to be positive. For pre-optimization procedures the start address value coincides with the start address of the procedure. After optimization, however, for a given basic block with a call-site in a child of a procedure split by optimization, the landing pad may remain in the parent. Thus, the base offset for the landing pad could be negative depending on the relative placements of the split procedures. One solution to this problem is to represent a negative offset as an unsigned number. When the personality routine reads the negative offset, it interprets it as a large positive number. Any address arithmetic done using this large positive number produces the correct final addresses due to the wrap-around effect as is known in the art.

The optimizer then writes, FIG. 1 at 120, unwind table and unwind information records 140 in the output program 135 using modified unwind state records for various procedures.

Embodiments may be provided as a computer program product that may include a machine-readable medium having stored thereon data which when accessed by a machine may cause the machine to perform a process according to the claimed subject matter. The machine-readable medium may include, but is not limited to, floppy diskettes, optical disks, DVD-ROM disks, DVD-RAM disks, DVD-RW disks, DVD+RW disks, CD-R disks, CD-RW disks, CD-ROM disks, and magneto-optical disks, ROMs, RAMs, EPROMs, EEPROMs, magnet or optical cards, flash memory, or other type of media/machine-readable medium suitable for storing electronic instructions.

Many of the methods are described in their most basic form but steps can be added to or deleted from any of the methods and information can be added or subtracted from any of the described messages without departing from the basic scope of the claimed subject matter. It will be apparent to those skilled in the art that many further modifications and adaptations can be made. The particular embodiments are not provided to limit the invention but to illustrate it. The scope of the claimed subject matter is not to be determined by the specific examples provided above but only by the claims below.

What is claimed is:

1. A method comprising:

analyzing a first binary version of a program and unwind information associated with the first binary version of the program, the unwind information including:
information for restoring registers when unwinding a program stack for the first binary version, and
information for processing exceptions to unwinding the program stack for the first binary version;

annotating internal representations of the first binary version in accordance with the unwind information, the internal representations corresponding to unwind regions comprising any one or more of instructions, basic blocks, and procedures of the program's source code, wherein annotating includes, for each procedure:
generating a sequence of unwind state records for the unwind regions and attaching the sequence of unwind state records to the internal representation corresponding to the procedure,
generating decoded type and decoded action tables, and attaching the tables to the internal representation corresponding to the procedure;
decorating selected instructions of the internal representation with attributes encoding any one of: a field for a register in the unwind state record pointing to a slot corresponding to the selected instruction, a landing pad for a basic block or instruction;

generating unwind rules for each instruction of the annotated internal representations, the unwind rules governing how to unwind out of an enclosing procedure at each instruction;

performing optimization on the first binary version to produce a second binary version of the program in accordance with the unwind rules governing how to unwind out of the enclosing procedure at each instruction of the annotated internal representations of the first binary version; and generating updated unwind information for the second binary version, the updated unwind information including:
information for restoring registers when unwinding a program stack for the second binary version, and
information for processing exceptions when unwinding the program stack for the second binary version.

2. The method of claim 1 wherein the unwind information is associated with each unwind region of the first binary version, and the updated unwind information is associated with each unwind region of the second binary version, the unwind regions comprising any one or more of instructions, basic blocks, and procedures of the program's source code.

3. The method of claim 1 wherein the information for processing exceptions is defined in accordance with a source language of a source code version of the program, the first binary version being derived at least in part by the execution of a compiler of the source language on the source code version.

4. The method of claim 1 wherein performing optimization on the first binary version to produce the second binary version in accordance with the unwind rules governing how to unwind out of the enclosing procedure at each instruction comprises any one or more of:

identifying which instructions represented in the first binary version have been annotated in accordance with the unwind information;

protecting the identified instructions from being deleted from the second binary version during performing optimization; and protecting the identified instructions of the first binary version from being moved from one basic block type to a different basic block type in the second binary version during performing optimization.

5. The method of claim 1 wherein generating updated unwind information for second binary version unwind rules governing how to unwind out of the enclosing procedure at each instruction comprises any one or more of:

identifying which instructions represented in the first binary version have been duplicated in the second binary version;

generating a representation of the duplicated instruction in the second binary version;

generating unwind information for the representation of the duplicated instruction from unwind information for the representation in the first binary version of the instruction from which the duplicated instruction originated; and adding the generated unwind information for the representation of the duplicated instruction to the updated unwind information for the second binary version.

6. The method of claim 1 wherein generating updated unwind information for second binary version in accordance with the unwind rules governing how to unwind out of the enclosing procedure at each instruction comprises any one or more of:
    identifying which procedures represented in the first binary version have been split into two or more new procedures in the second binary version;
    generating a representation of each new procedure in the second binary version;
generating unwind information for the representation of each new procedure from unwind information for the representation in the first binary version of the procedure in which the split occurred; and
    adding the new unwind information to the updated unwind information for the second binary version.

7. A system comprising:
a processor communicatively coupled to a storage device;
an analysis module stored on the storage device and executable by the processor, the analysis module to analyze a first binary version of a program and unwind information associated with the first binary version of the program, the unwind information including:
    information for restoring registers when unwinding a program stack for the first binary version, and
    information for processing exceptions to unwinding the program stack for the first binary version;
an annotation module stored on the storage device and executable by the processor, the annotation module to annotate internal representations of the first binary version in accordance with the unwind information, the internal representations corresponding to unwind regions comprising any one or more of instructions, basic blocks, and procedures of the program's source code, wherein to annotate is to, for each procedure:
    generate a sequence of unwind state records for the unwind regions and attach the sequence of unwind state records to the internal representation corresponding to the procedure,
    generate decoded type and decoded action tables, and attach the tables to the internal representation corresponding to the procedure;
    decorate selected instructions of the internal representation with attributes encoding any one of: a field for a register in the unwind state record pointing to a slot corresponding to the selected instruction, a landing pad for a basic block or instruction;
an optimization module stored on the storage device and executable by the processor, the optimization module to generate unwind rules for each instruction of the annotated internal representations, the unwind rules governing how to unwind out of an enclosing procedure at each instruction and perform optimization on the first binary version to produce a second binary version of the program in accordance with the unwind rules governing how to unwind out of the enclosing procedure at each instruction; and a generation module stored on the storage device and executable by the processor to generate new unwind information for the second binary version, the new unwind information including:
    information for restoring registers when unwinding a program stack for the second binary version, and
    information for processing exceptions when unwinding the program stack for the second binary version.

8. The system of claim 7 wherein the unwind information is associated with each unwind region of the first binary version, and the new unwind information is associated with each unwind region of the second binary version, the unwind regions comprising any one or more of instructions, basic blocks, and procedures of the program's source code.

9. The system of claim 7 wherein the information for processing exceptions is defined in accordance with a source language of a source code version of the program, the first binary version being derived at least in part by the execution of a compiler of the source language on the source code version.

10. A non-transitory machine accessible medium having stored thereon data which when accessed by a machine causes the machine to perform a method, the method comprising:
    analyzing a pre-optimized version of a program and unwind information associated with the pre-optimized version of the program, the unwind information including:
        information for restoring registers when unwinding a program stack for the pre-optimized version, and
        information for processing exceptions to unwinding the program stack for the pre-optimized version;
    annotating internal representations of the pre-optimized version in accordance with the unwind information, the internal representations corresponding to unwind regions comprising any one or more of instructions, basic blocks, and procedures of the program's source code, wherein annotating includes, for each procedure:
        generating a sequence of unwind state records for the unwind regions and attaching the sequence of unwind state records to the internal representation corresponding to the procedure,
        generating decoded type and decoded action tables, and attaching the tables to the internal representation corresponding to the procedure;
        decorating selected instructions of the internal representation with attributes encoding any one of: a field for a register in the unwind state record pointing to a slot corresponding to the selected instruction, a landing pad for a basic block or instruction;
    generating unwind rules for each instruction of the annotated internal representations, the unwind rules governing how to unwind out of an enclosing procedure at each instruction;
    performing optimization on the pre-optimized version to produce an optimized version of the program in accordance with the unwind rules governing how to unwind out of the enclosing procedure at each instruction; and
    generating new unwind information for the optimized version, the new unwind information including:

information for restoring registers when unwinding a program stack for the optimized version, and information for processing exceptions when unwinding the program stack for the optimized version.

11. The non-transitory machine accessible medium of claim 10 wherein the unwind information is associated with each unwind region of the pre-optimized version, and the updated unwind information is associated with each unwind region of the optimized version, the unwind regions comprising any one or more of instructions, basic blocks, and procedures of the program's source code.

12. The non-transitory machine accessible medium of claim 10 wherein the information for processing exceptions is defined in accordance with a source language of a source code version of the program, the pre-optimized version being derived at least in part by the execution of a compiler of the source language on the source code version.

* * * * *